US008380186B2

(12) United States Patent
Karabinis

(10) Patent No.: US 8,380,186 B2
(45) Date of Patent: Feb. 19, 2013

(54) SATELLITE WITH DIFFERENT SIZE SERVICE LINK ANTENNAS AND RADIOTERMINAL COMMUNICATION METHODS USING SAME

(75) Inventor: Peter D. Karabinis, Cary, NC (US)

(73) Assignee: ATC Technologies, LLC, Reston, VA (US)

( * ) Notice: Subject to any disclaimer, the term of this patent is extended or adjusted under 35 U.S.C. 154(b) by 1474 days.

(21) Appl. No.: 11/036,230

(22) Filed: Jan. 14, 2005

(65) Prior Publication Data

US 2005/0164700 A1 Jul. 28, 2005

Related U.S. Application Data

(60) Provisional application No. 60/538,299, filed on Jan. 22, 2004.

(51) Int. Cl.
*H04Q 7/20* (2006.01)
(52) U.S. Cl. ........ 455/427; 455/431; 455/430; 455/429; 455/12.1; 455/13.2; 455/13.3; 455/13.1
(58) Field of Classification Search .................. 455/427, 455/430, 429, 12.1, 431, 16, 13.2, 13.3, 13.1
See application file for complete search history.

(56) References Cited

U.S. PATENT DOCUMENTS

| | | | |
|---|---|---|---|
| 4,689,625 A * | 8/1987 | Barmat | 342/356 |
| 4,901,307 A | 2/1990 | Gilhousen et al. | |
| 5,073,900 A | 12/1991 | Mallinckrodt | |
| 5,303,286 A | 4/1994 | Wiedeman | |
| 5,339,330 A | 8/1994 | Mallinckrodt | |
| 5,394,561 A | 2/1995 | Freeburg | |
| 5,446,756 A | 8/1995 | Mallinckrodt | |
| 5,448,623 A | 9/1995 | Wiedeman et al. | |
| 5,511,233 A | 4/1996 | Otten | |
| 5,555,257 A | 9/1996 | Dent | |
| 5,584,046 A | 12/1996 | Martinez et al. | |
| 5,594,941 A | 1/1997 | Dent | |
| 5,612,703 A | 3/1997 | Mallinckrodt | |
| 5,619,525 A | 4/1997 | Wiedeman et al. | |
| 5,631,898 A | 5/1997 | Dent | |
| 5,642,358 A | 6/1997 | Dent | |
| 5,761,605 A | 6/1998 | Tawil et al. | |
| 5,765,098 A | 6/1998 | Bella | |

(Continued)

FOREIGN PATENT DOCUMENTS

| | | |
|---|---|---|
| EP | 0 506 255 A2 | 9/1992 |
| EP | 0 597 225 A1 | 5/1994 |

(Continued)

OTHER PUBLICATIONS

"Notification of Transmittal of The International Search Report and the Written Opinion of the International Searching Authority, or the Declaration", "Written Opinion of the International Searching Authority" and "International Search Report", PCT/US2005/001451, Jul. 13, 2005.

(Continued)

*Primary Examiner* — Kwasi Karikari
(74) *Attorney, Agent, or Firm* — Myers Bigel Sibley & Sajovec, P.A.

(57) ABSTRACT

A space segment for a radioterminal communications system includes a satellite having service link antennas of different sizes that are configured to communicate with at least one radioterminal. The service link antennas of different size may serve different sized geographic areas, which may at least partially overlap. Analogous radioterminal communications methods also are provided.

66 Claims, 1 Drawing Sheet

U.S. PATENT DOCUMENTS

| | | | |
|---|---|---|---|
| 5,812,947 A | 9/1998 | Dent | |
| 5,832,379 A | 11/1998 | Mallinckrodt | |
| 5,835,857 A | 11/1998 | Otten | |
| 5,848,060 A | 12/1998 | Dent | |
| 5,852,721 A | 12/1998 | Dillon et al. | |
| 5,878,329 A | 3/1999 | Mallinckrodt | |
| 5,884,142 A | 3/1999 | Wiedeman et al. | |
| 5,907,541 A | 5/1999 | Fairholm et al. | |
| 5,926,758 A | 7/1999 | Grybos et al. | |
| 5,937,332 A | 8/1999 | Karabinis | |
| 5,940,753 A | 8/1999 | Mallinckrodt | |
| 5,991,345 A | 11/1999 | Ramasastry | |
| 5,995,832 A | 11/1999 | Mallinckrodt | |
| 6,011,951 A | 1/2000 | King et al. | |
| 6,014,372 A * | 1/2000 | Kent et al. | 370/316 |
| 6,023,605 A | 2/2000 | Sasaki et al. | |
| 6,052,560 A | 4/2000 | Karabinis | |
| 6,052,586 A | 4/2000 | Karabinis | |
| 6,067,442 A | 5/2000 | Wiedeman et al. | |
| 6,072,430 A | 6/2000 | Wyrwas et al. | |
| 6,085,094 A | 7/2000 | Vasudevan et al. | |
| 6,091,933 A | 7/2000 | Sherman et al. | |
| 6,097,752 A | 8/2000 | Wiedeman et al. | |
| 6,101,385 A | 8/2000 | Monte et al. | |
| 6,108,561 A | 8/2000 | Mallinckrodt | |
| 6,122,499 A * | 9/2000 | Magnusson | 455/405 |
| 6,134,437 A | 10/2000 | Karabinis et al. | |
| 6,157,811 A | 12/2000 | Dent | |
| 6,157,834 A | 12/2000 | Helm et al. | |
| 6,160,994 A | 12/2000 | Wiedeman | |
| 6,169,878 B1 | 1/2001 | Tawil et al. | |
| 6,198,730 B1 | 3/2001 | Hogberg et al. | |
| 6,198,921 B1 | 3/2001 | Youssefzadeh et al. | |
| 6,201,967 B1 | 3/2001 | Goerke | |
| 6,233,463 B1 | 5/2001 | Wiedeman et al. | |
| 6,240,124 B1 | 5/2001 | Wiedeman et al. | |
| 6,253,080 B1 | 6/2001 | Wiedeman et al. | |
| 6,256,497 B1 | 7/2001 | Chambers | |
| 6,324,405 B1 | 11/2001 | Young et al. | |
| 6,339,707 B1 | 1/2002 | Wainfan et al. | |
| 6,418,147 B1 | 7/2002 | Wiedeman | |
| 6,449,461 B1 | 9/2002 | Otten | |
| 6,496,682 B2 * | 12/2002 | Butte et al. | 455/12.1 |
| 6,522,865 B1 | 2/2003 | Otten | |
| 6,526,278 B1 | 2/2003 | Hanson et al. | |
| 6,628,919 B1 | 9/2003 | Curello et al. | |
| 6,684,057 B2 | 1/2004 | Karabinis | |
| 6,735,437 B2 | 5/2004 | Mayfield et al. | |
| 6,775,251 B1 * | 8/2004 | Wiedeman et al. | 370/316 |
| 6,785,543 B2 | 8/2004 | Karabinis | |
| 6,856,787 B2 | 2/2005 | Karabinis | |
| 6,859,652 B2 | 2/2005 | Karabinis et al. | |
| 6,879,829 B2 | 4/2005 | Dutta et al. | |
| 6,892,068 B2 | 5/2005 | Karabinis et al. | |
| 6,937,857 B2 | 8/2005 | Karabinis | |
| 6,975,837 B1 | 12/2005 | Santoru | |
| 6,999,720 B2 | 2/2006 | Karabinis | |
| 7,006,789 B2 | 2/2006 | Karabinis et al. | |
| 2002/0006795 A1 * | 1/2002 | Norin et al. | 455/429 |
| 2002/0041575 A1 | 4/2002 | Karabinis et al. | |
| 2002/0090942 A1 | 7/2002 | Karabinis et al. | |
| 2002/0122408 A1 | 9/2002 | Mullins | |
| 2002/0146979 A1 | 10/2002 | Regulinski et al. | |
| 2002/0177465 A1 | 11/2002 | Robinett | |
| 2003/0003815 A1 | 1/2003 | Yamada | |
| 2003/0022625 A1 | 1/2003 | Otten et al. | |
| 2003/0054761 A1 | 3/2003 | Karabinis | |
| 2003/0054762 A1 | 3/2003 | Karabinis | |
| 2003/0054814 A1 | 3/2003 | Karabinis et al. | |
| 2003/0054815 A1 | 3/2003 | Karabinis | |
| 2003/0068978 A1 | 4/2003 | Karabinis et al. | |
| 2003/0073436 A1 | 4/2003 | Karabinis et al. | |
| 2003/0149986 A1 | 8/2003 | Mayfield et al. | |
| 2003/0153267 A1 | 8/2003 | Karabinis | |
| 2003/0153308 A1 | 8/2003 | Karabinis | |
| 2003/0224785 A1 | 12/2003 | Karabinis | |
| 2004/0072539 A1 * | 4/2004 | Monte et al. | 455/13.4 |
| 2004/0102156 A1 | 5/2004 | Loner | |
| 2004/0121727 A1 | 6/2004 | Karabinis | |
| 2004/0142660 A1 | 7/2004 | Churan | |
| 2004/0192200 A1 | 9/2004 | Karabinis | |
| 2004/0192293 A1 | 9/2004 | Karabinis | |
| 2004/0192395 A1 | 9/2004 | Karabinis | |
| 2004/0203393 A1 | 10/2004 | Chen | |
| 2004/0203742 A1 | 10/2004 | Karabinis | |
| 2004/0240525 A1 | 12/2004 | Karabinis et al. | |
| 2004/0242152 A1 * | 12/2004 | Jarett | 455/12.1 |
| 2004/0259497 A1 * | 12/2004 | Dent | 455/13.3 |
| 2005/0026606 A1 | 2/2005 | Karabinis | |
| 2005/0037749 A1 | 2/2005 | Karabinis et al. | |
| 2005/0041619 A1 | 2/2005 | Karabinis et al. | |
| 2005/0064813 A1 | 3/2005 | Karabinis | |
| 2005/0079816 A1 | 4/2005 | Singh et al. | |
| 2005/0090256 A1 | 4/2005 | Dutta | |
| 2005/0118948 A1 | 6/2005 | Karabinis et al. | |
| 2005/0136836 A1 | 6/2005 | Karabinis et al. | |
| 2005/0164700 A1 | 7/2005 | Karabinis | |
| 2005/0164701 A1 | 7/2005 | Karabinis et al. | |
| 2005/0170834 A1 | 8/2005 | Dutta et al. | |
| 2005/0181786 A1 | 8/2005 | Karabinis et al. | |
| 2005/0201449 A1 | 9/2005 | Churan | |
| 2005/0208890 A1 | 9/2005 | Karabinis | |
| 2005/0221757 A1 | 10/2005 | Karabinis | |
| 2005/0227618 A1 | 10/2005 | Karabinis et al. | |
| 2005/0239399 A1 | 10/2005 | Karabinis | |
| 2005/0239403 A1 | 10/2005 | Karabinis | |
| 2005/0239404 A1 | 10/2005 | Karabinis | |
| 2005/0239457 A1 | 10/2005 | Levin et al. | |
| 2005/0245192 A1 | 11/2005 | Karabinis | |
| 2005/0260947 A1 | 11/2005 | Karabinis et al. | |
| 2005/0260984 A1 | 11/2005 | Karabinis | |
| 2005/0265273 A1 | 12/2005 | Karabinis et al. | |
| 2005/0272369 A1 | 12/2005 | Karabinis et al. | |
| 2005/0282542 A1 | 12/2005 | Karabinis | |
| 2005/0288011 A1 | 12/2005 | Dutta | |
| 2006/0040659 A1 | 2/2006 | Karabinis | |

FOREIGN PATENT DOCUMENTS

| | | |
|---|---|---|
| EP | 0 637 185 A2 | 2/1995 |
| EP | 0 506 255 B1 | 11/1996 |
| EP | 0 748 065 A2 | 12/1996 |
| EP | 0 755 163 A2 | 1/1997 |
| EP | 0 762 669 A2 | 3/1997 |
| EP | 0 762 669 A3 | 3/1997 |
| EP | 0 797 319 A2 | 9/1997 |
| EP | 0 831 599 A2 | 3/1998 |
| EP | 0 831 599 A3 | 3/1998 |
| EP | 0 910 180 A2 | 4/1999 |
| EP | 1 050 980 A1 | 11/2000 |
| EP | 1 059 826 A1 | 12/2000 |
| EP | 1 193 989 A1 | 4/2002 |
| JP | 58146148 | 8/1983 |
| WO | WO 01/54314 A1 | 7/2001 |

OTHER PUBLICATIONS

Karabinis et al., *Space-Based Networks and Methods With Ground-Based Beam Forming*, U.S. Appl. No. 60/572,164, filed May 18, 2004.

Dutta, *Methods of Ground Based Beamforming and On-Board Frequency Translation and Related Systems*, U.S. Appl. No. 60/583,218, filed Jun. 25, 2004.

Zheng, *Adaptive Beam-Forming With Interference Suppression and Multi-User Detection in Satellite Systems With Terrestrial Reuse of Frequencies*, U.S. Provisional Application Serial No. Unknown, filed Jan. 5, 2005.

Global.com, "Globalstar Demonstrates World's First Prototype of Terrestrial System to Supplemental Satellite Phones," http://www.globalcomsatphone.com/globalcom/globalstar_terrestrial_system.html, Jul. 18, 2002, 2 pages.

Ayyagari et al., "A satellite-augmented cellular network concept", *Wireless Networks*, Vo. 4, 1998, pp. 189-198.

"Antenna noise temperature". (Sep. 1, 2008). In *Wikipedia, the free encyclopedia*. Retrieved Oct. 21, 2008 from http://en.wikipedia.org/wiki/Antenna_noise_temperature.

"Gain-to-Noise Temperature Ratio". In *Webster's Online Dictionary*. Retrieved Oct. 20, 2008 from http://www.websters-online-dictionary.org/ga/gain-to-noise+temperature+ratio.html.

"Signal-to-interference ratio". (Jul. 18, 2008). In *Wikipedia, the free encyclopedia*. Retrieved Oct. 21, 2008 from http://en.wikipedia.org/wiki/Carrier-to-Interference_Ratio.

"System Noise Temperature and G/T Calculator". In SATCOMonline. Retrieved Oct. 21, 2008 from http://ww.satcom.co.uk/article.asp?article=23.

* cited by examiner

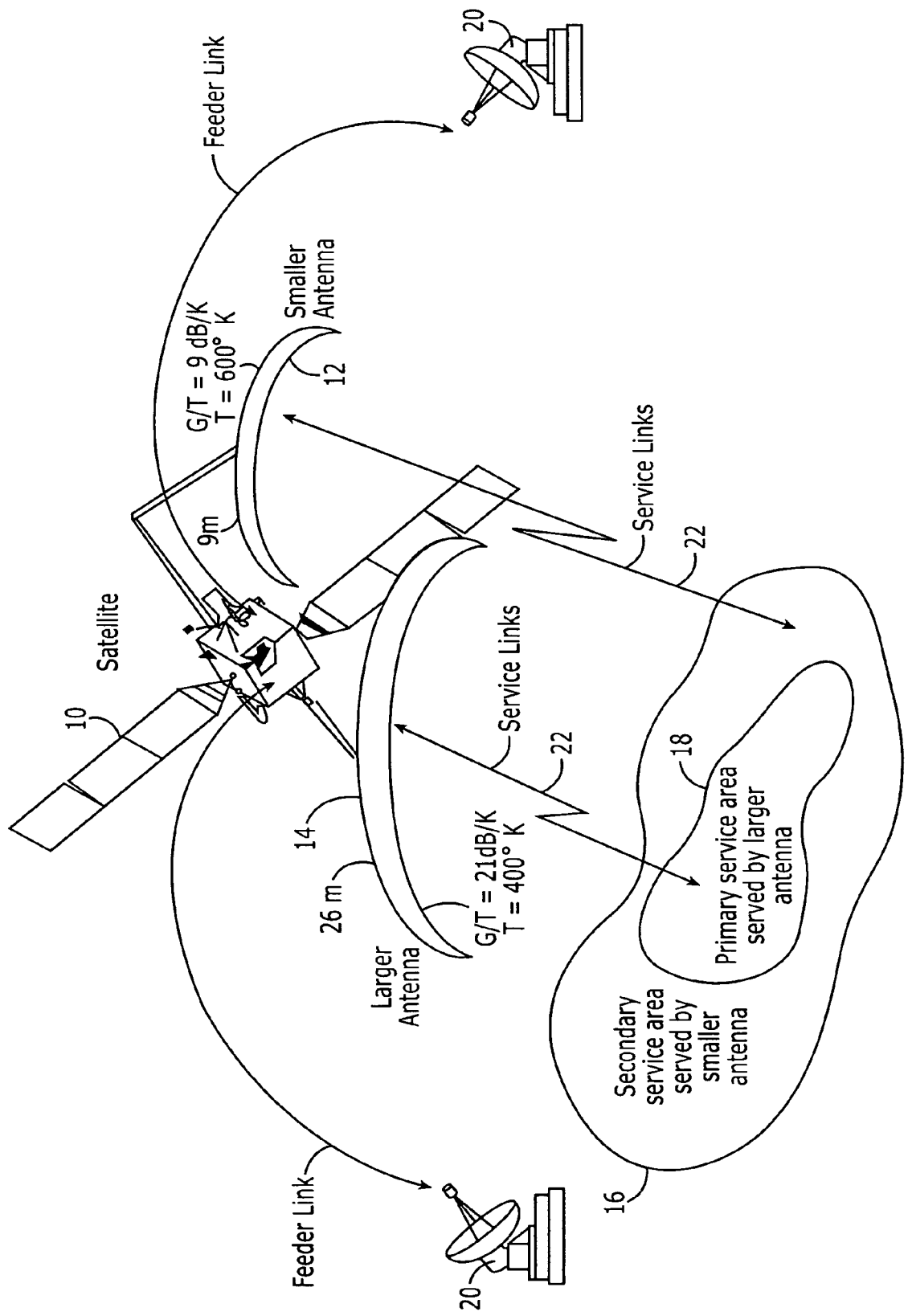

SATELLITE WITH DIFFERENT SIZE SERVICE LINK ANTENNAS AND RADIOTERMINAL COMMUNICATION METHODS USING SAME

CROSS-REFERENCE TO RELATED APPLICATIONS

This application claims the benefit of provisional Application No. 60/538,299, filed Jan. 22, 2004, entitled Satellite With Different Size Service Link Antennas and Radioterminal Communication Methods Using Same, the disclosure of which is hereby incorporated herein by reference in its entirety as if set forth fully herein.

FIELD OF THE INVENTION

This invention relates to radioterminal communications systems and methods, and more particularly to terrestrial and satellite radioterminal communications systems and methods.

BACKGROUND OF THE INVENTION

Satellite radioterminal communication systems and methods are widely used for communicating among radioterminals and/or among radioterminals and wire-line terminals. As is well known to those having skill in the art, a satellite radioterminal communication system includes a space segment, which includes one or more satellites and one or more gateways. The satellite(s) communicate with radioterminals over a plurality of service links and communicate with the gateway(s) over one or more feeder links using one or more antennas at the satellite(s).

As used herein, the term "radioterminal" includes cellular and/or satellite radioterminals with or without a multi-line display; Personal Communications System (PCS) terminals that may combine a radioterminal with data processing, facsimile and/or data communications capabilities; Personal Digital Assistants (PDA) that can include a radio frequency transceiver and a pager, Internet/Intranet access, Web browser, organizer, calendar and/or a global positioning system (GPS) receiver; and/or conventional laptop and/or palmtop computers or other appliances, which include a radio frequency transceiver. As used herein, the term "radioterminal" also includes any other radiating user device/equipment/source that may have time-varying or fixed geographic coordinates, and may be portable, transportable, installed in a vehicle (aeronautical, maritime, or land-based), or situated and/or configured to operate locally and/or in a distributed fashion at any other location(s) on earth and/or in space. A "radioterminal" also may be referred to herein as a "radiotelephone," "terminal" or "wireless user device".

These radioterminals can include satellite-only radioterminals and/or multi-mode satellite/terrestrial radioterminals. The multi-mode satellite/terrestrial radioterminals may be configured to communicate with an ancillary terrestrial network using one or more satellite frequencies.

Satellite radioterminal communications systems and methods that may employ terrestrial reuse of satellite frequencies are also described in U.S. Pat. No. 6,785,543 to Karabinis, entitled Filters For Combined Radiotelephone/GPS Terminals, and Published U.S. patent application Nos. US 2003/0054761 to Karabinis, entitled Spatial Guardbands for Terrestrial Reuse of Satellite Frequencies; US 2003/0054814 to Karabinis et al., entitled Systems and Methods for Monitoring Terrestrially Reused Satellite Frequencies to Reduce Potential Interference; US 2003/0054762 to Karabinis, entitled Multi-Band/Multi-Mode Satellite Radiotelephone Communications Systems and Methods; US 2003/0153267 to Karabinis, entitled Wireless Communications Systems and Methods Using Satellite-Linked Remote Terminal Interface Subsystems; US 2003/0224785 to Karabinis, entitled Systems and Methods for Reducing Satellite Feeder Link Bandwidth/Carriers In Cellular Satellite Systems; US 2002/0041575 to Karabinis et al., entitled Coordinated Satellite-Terrestrial Frequency Reuse; US 2002/0090942 to Karabinis et al., entitled Integrated or Autonomous System and Method of Satellite-Terrestrial Frequency Reuse Using Signal Attenuation and/or Blockage, Dynamic Assignment of Frequencies and/or Hysteresis; US 2003/0068978 to Karabinis et al., entitled Space-Based Network Architectures for Satellite Radiotelephone Systems; US 2003/0153308 to Karabinis, entitled Staggered Sectorization for Terrestrial Reuse of Satellite Frequencies; and US 2003/0054815 to Karabinis, entitled Methods and Systems for Modifying Satellite Antenna Cell Patterns In Response to Terrestrial Reuse of Satellite Frequencies, US 2004/0121727 to Karabinis, entitled Systems and Methods For Terrestrial Reuse of Cellular Satellite Frequency Spectrum In A Time-Division Duplex Mode, US 2004/0192293 to Karabinis, entitled Aggregate Radiated Power Control For Multi-Band/Multi-Mode Satellite Radiotelephone Communications Systems And Methods, US 2004/0142660 to Churan, entitled Network-Assisted Global Positioning Systems, Methods And Terminals Including Doppler Shift And Code Phase Estimates, and US 2004/0192395 to Karabinis, entitled Co-Channel Wireless Communication Methods and Systems Using Nonsymmetrical Alphabets, all of which are assigned to the assignee of the present invention, the disclosures of all of which are hereby incorporated herein by reference in their entirety as if set forth fully herein.

For a given size of an antenna feed network (e.g., for a given number of antenna feed elements), as the antenna size (e.g., the reflector diameter) of a satellite antenna grows, the geographic area that can be served subject to a specified performance index (such as a specified satellite antenna gain over noise temperature (G/T)) generally becomes smaller. In order to increase the geographic area that can be served by a given satellite antenna size (subject to a specified satellite performance index) the size of the antenna feed network may have to be increased. This may be prohibitive, in some applications, where the size, mass and/or heat dissipation of a satellite has exceeded a certain limit. Growing the size of an antenna feed network may also require additional signal processing by the satellite payload which may further aggravate the size, mass and/or heat dissipation constraints of the satellite.

SUMMARY OF THE INVENTION

Embodiments of the present invention provide a space segment for a radioterminal communications system that comprises a satellite having service link antennas of different sizes that are configured to communicate with at least one radioterminal. In some embodiments, the service link antennas of different size may serve different sized geographic areas, which may at least partially overlap. Analogous radioterminal communications methods also are provided.

BRIEF DESCRIPTION OF THE DRAWINGS

FIG. 1 schematically illustrates satellites and satellite communication methods according to various embodiments of the present invention.

DETAILED DESCRIPTION

Specific exemplary embodiments of the invention now will be described with reference to the accompanying drawing. This invention may, however, be embodied in many different forms and should not be construed as limited to the embodiments set forth herein. Rather, these embodiments are provided so that this disclosure will be thorough and complete, and will fully convey the scope of the invention to those skilled in the art. In the drawing, like numbers refer to like elements. It will be understood that when an element is referred to as being "connected" or "coupled" to another element, it can be directly connected or coupled to the other element or intervening elements may be present. Furthermore, "connected" or "coupled" as used herein may include wirelessly connected or coupled.

The terminology used herein is for the purpose of describing particular embodiments only and is not intended to be limiting of the invention. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

It will be understood that although the terms first and second are used herein to describe various elements, these elements should not be limited by these terms. These terms are only used to distinguish one element from another element. Thus, a first antenna below could be termed a second antenna, and similarly, a second antenna may be termed a first antenna without departing from the teachings of the present invention. As used herein, the term "and/or" includes any and all combinations of one or more of the associated listed items. The symbol "/" is also used as a shorthand notation for "and/or".

FIG. 1 illustrates a satellite 10 having at least two service link 22 antennas—one larger than the other, according to some embodiments of the invention. The smaller antenna 12 (e.g., a reflector 9 meters in diameter) forms larger satellite beams (cells) on the ground and can thus serve a larger geographic area 16 (the area labeled as "secondary service area") while using a smaller number of antenna feed network elements (radiators) compared to the number of antenna feed network elements that may be used by a larger antenna 14 to serve the same geographic area. The larger antenna 14 (e.g., a reflector 26 meters in diameter) forms smaller higher-gain satellite beams (cells) on the ground and provides service over a smaller geographic area 18 (the area labeled as "primary service area") which can keep the number of its feed network elements smaller compared with a number of feed network elements that the larger antenna 14 may use to provide service over both the primary and secondary service areas.

In some embodiments, the smaller antenna 12 and its feed network may be configured to provide service over both the secondary 16 and primary 18 service areas. Alternatively, the smaller antenna 12 and its associated feed network may be configured to provide service only over the secondary service area 16 and service to the primary service area 18 may be provided by the larger antenna 14 only. In yet other embodiments, the secondary service area 16 and the primary service area 18 may partially overlap, or the primary service area 18 may be contained within the secondary service area 16, as shown in FIG. 1.

The signal processing associated with the smaller antenna 12 and its feed network and/or the larger antenna 14 and its feed network (such as beam forming and/or signal channelization) may be operative on-board the satellite 10 (as per the Thuraya and/or Inmarsat-4 satellite configurations) and/or it may be operative on the ground such as at a satellite gateway or gateway(s) 20, as described, for example, in U.S. Pat. Nos. 6,157,811; 5,848,060; 5,812,947; 5,631,898; 5,594,941 and/or 5,555,257 and/or in provisional Application Ser. Nos. 60/572,164, entitled "Space-Based Networks and Methods with Ground-Based Beam Forming," filed May 18, 2004; 60/583,218, entitled "Methods of Ground Based Beamforming and On-Board Frequency Translation and Related Systems," filed Jun. 25, 2004; and 60/641,560, "Adaptive Beam-Forming with Interference Suppression and Multi-User Detection in Satellite Systems with Terrestrial Reuse of Frequencies," filed Jan. 5, 2005, all of which provisional applications are assigned to the assignee of the present invention, the disclosures of all of which are hereby incorporated herein by reference in their entirety as if set forth fully herein.

In some embodiments, the smaller antenna 12 and its feed network are configured to serve a service area (primary 18 and secondary 16, or just secondary 16) with the associated beam forming and/or channelization processor operative at the satellite 10, while the larger antenna 14 and its feed network are configured to serve the primary service area 18 with its associated beam forming and/or channelization processor operative on the ground (e.g., at a satellite ground facility (gateway 20) or distributed between more than one satellite ground facilities (gateways 20)). In some embodiments, the forward-link beam forming and/or channelization processor associated with a satellite antenna (larger 14 and/or smaller 12) and its corresponding feed network are operative at the satellite 10 while the return-link beam forming and/or channelization processor is operative on the ground 20. In yet other embodiments, the smaller antenna 12 is configured to receive only Right Hand Circularly Polarized (RHCP) radiation or Left Hand Circularly Polarized (LHCP) radiation, and the larger antenna 14 is configured to receive both RHCP and LHCP radiation. The embodiments described in this paragraph also may be combined.

In the drawing and specification, there have been disclosed embodiments of the invention and, although specific terms are employed, they are used in a generic and descriptive sense only and not for purposes of limitation, the scope of the invention being set forth in the following claims.

What is claimed is:

1. A space segment for a radioterminal communications system comprising:
    a satellite including service link antennas of different sizes, each of said service link antennas being configured to communicate with at least one radioterminal, at least one of the service link antennas being configured to receive both Left Hand Circularly Polarized (LHCP) radiation and Right Hand Circularly Polarized (RHCP) radiation, wherein a gain-to-temperature ratio (G/T) of the at least one of the service link antennas that is configured to receive both LHCP radiation and RHCP radiation comprises a value of 21 dB/K.

2. The system according to claim 1 wherein the service link antennas of different sizes comprise:
a first service link antenna; and
a second service link antenna that is smaller than the first service link antenna;
wherein the G/T of the first service link antenna comprises a value of 21 dB/K and the G/T of the second service link antenna comprises a value of 9 dB/K.

3. The system according to claim 2 wherein the first service link antenna is configured to serve a first geographic area and wherein the second service link antenna is configured to serve a second geographic area that is larger than the first geographic area.

4. The system according to claim 3 wherein the first geographic area is geographically distinct from, geographically overlaps with, or is geographically contained within the second geographic area.

5. The system according to claim 3 wherein the first service link antenna is configured to form smaller, higher gain satellite beams than the second service link antenna.

6. The system according to claim 5 wherein the first service link antenna includes more radiators than the second service link antenna.

7. The system according to claim 2 wherein the first service link antenna is configured to receive both LHCP radiation and RHCP radiation and wherein the second service link antenna is configured to receive only LHCP or RHCP radiation.

8. The system according to claim 2 wherein the first and second service link antennas comprise reflectors.

9. The system according to claim 2 wherein the satellite further comprises a signal processing equipment for the second service link antenna and is free of the signal processing equipment for the first service link antenna.

10. The system according to claim 2 wherein the satellite further comprises a signal processing equipment for a forward link of the first and/or second service link antennas and is free of the signal processing equipment for a return link of the first and/or second service link antennas.

11. The system according to claim 9 wherein the signal processing equipment comprises beam forming and/or channelization equipment.

12. The system according to claim 10 wherein the signal processing equipment comprises beam forming and/or channelization equipment.

13. A radioterminal communications method comprising:
communicating between a satellite and at least one radioterminal over a plurality of service links using a plurality of service link antennas of different sizes, wherein at least one of the service link antennas is configured to receive both Left Hand Circularly Polarized (LHCP) radiation and Right Hand Circularly Polarized (RHCP) radiation and wherein a gain-to-temperature ratio (G/T) of the at least one of the service link antennas that is configured to receive both LHCP radiation and RHCP radiation comprises a value of 21 dB/K.

14. The method according to claim 13 wherein the service link antennas of different sizes comprise:
a first service link antenna; and
a second service link antenna that is smaller than the first service link antenna;
wherein the G/T of the first service link antenna comprises a value of 21 dB/K and the G/T of the second service link antenna comprises a value of 9 dB/K.

15. The method according to claim 14 wherein communicating comprises:
communicating between the satellite and at least one radioterminal in a first geographic area using the first service link antenna; and
communicating between the satellite and at least one radioterminal in a second geographic area that is larger than the first geographic area, using the second service link antenna.

16. The method according to claim 15 wherein the first geographic area is geographically distinct from, geographically overlaps with, or is geographically contained within the second geographic area.

17. The method according to claim 15 further comprising:
forming smaller, higher gain satellite beams by the first service link antenna than by the second service link antenna.

18. The method according to claim 17 wherein the first service link antenna includes more radiators than the second service link antenna.

19. The method according to claim 14 further comprising:
receiving both LHCP radiation and RHCP radiation at the first service link antenna; and
receiving only LHCP or RHCP radiation at the second service link antenna.

20. The method according to claim 14 wherein the first and second service link antennas comprise reflectors.

21. The method according to claim 14 further comprising:
processing signals associated with the second service link antenna on-board the satellite; and
processing signals associated with the first service link antenna external to the satellite.

22. The method according to claim 14 further comprising:
processing signals associated with a forward link for the first and/or second service link antennas on-board the satellite; and
processing signals associated with a return link for the first and/or second service link antennas external to the satellite.

23. The method according to claim 21 wherein processing signals comprises beam forming and/or channelizing.

24. The method according to claim 22 wherein processing signals comprises beam forming and/or channelizing.

25. A space segment for a radioterminal communications system comprising:
a satellite comprising first and second service link antennas, wherein the first service link antenna is configured to receive both Left Hand Circularly Polarized (LHCP) radiation and Right Hand Circularly Polarized (RHCP) radiation and wherein the second service link antenna is configured to receive only LHCP or RHCP radiation, and
wherein a gain-to-temperature ratio (G/T) of said first service link antenna that is configured to receive both LHCP radiation and RHCP radiation comprises a value of 21 dB/K.

26. The system according to claim 25 wherein the first service link antenna is configured to form smaller, higher gain satellite beams than the second service link antenna, and wherein the G/T of the first service link antenna comprises a value of 21 dB/K and the G/T of the second service link antenna comprises a value of 9 dB/K.

27. The system according to claim 26 wherein the first service link antenna includes more radiators than the second service link antenna.

28. The system according to claim 25 wherein the satellite further comprises a signal processing equipment for the second service link antenna and is free of the signal processing equipment for the first service link antenna.

29. The system according to claim 25 wherein the satellite further comprises a signal processing equipment for a forward link of the first and/or second service link antennas and is free of the signal processing equipment for a return link of the first and/or second service link antennas.

30. The system according to claim 28 wherein the signal processing equipment comprises beam forming and/or channelization equipment.

31. The system according to claim 29 wherein the signal processing equipment comprises beam forming and/or channelization equipment.

32. A radioterminal communications method comprising:
communicating between a satellite and at least one radioterminal over a plurality of service links using first and second service link antennas, wherein communicating comprises:
receiving both Left Hand Circularly Polarized (LHCP) radiation and Right Hand Circularly Polarized (RHCP) radiation at the first service link antenna; and
receiving only LHCP or RHCP radiation at the second service link antenna, and
wherein a gain-to-temperature ratio (G/T) of said first service link antenna that receives both LHCP radiation and RHCP radiation comprises a value of 21 dB/K.

33. The method according to claim 32 further comprising:
forming smaller, higher gain satellite beams by the first service link antenna than by the second service link antenna, wherein the G/T of the first service link antenna comprises a value of 21 dB/K and the G/T of the second service link antenna comprises a value of 9 dB/K.

34. The method according to claim 33 wherein the first service link antenna includes more radiators than the second service link antenna.

35. The method according to claim 32 further comprising:
processing signals associated with the second service link antenna on-board the satellite; and
processing signals associated with the first service link antenna external to the satellite.

36. The method according to claim 32 further comprising:
processing signals associated with a forward link for the first and/or second service link antennas on-board the satellite; and
processing signals associated with a return link for the first and/or second service link antennas external to the satellite.

37. The method according to claim 35 wherein processing signals comprises beam forming and/or channelizing.

38. The method according to claim 36 wherein processing signals comprises beam forming and/or channelizing.

39. A space segment for a radioterminal communications system comprising:
a satellite comprising a first service link antenna configured to provide a first return service link and a first forward service link for communicating with at least one radioterminal and a second service link antenna that is smaller than the first service link antenna and configured to provide a second return service link and a second forward service link for communicating with at least one radioterminal;
wherein the satellite further comprises a signal processing equipment for at least one of the first return service link, the first forward service link, the second return service link and/or the second forward service link and is free of the signal processing equipment for at least another one of the first return service link, the first forward service link, the second return service link and/or the second forward service link, and
wherein a gain-to-temperature ratio (G/T) of said first service link antenna configured to provide a first return service link comprises a value of 21 dB/K.

40. The system according to claim 39 wherein the first service link antenna is configured to serve a first geographic area and wherein the second service link antenna is configured to serve a second geographic area that is larger than the first geographic area.

41. The system according to claim 40 wherein the first geographic area is geographically distinct from, geographically overlaps with, or is geographically contained within the second geographic area.

42. The system according to claim 40 wherein the first service link antenna is configured to form smaller, higher gain satellite beams than the second service link antenna, and wherein the G/T of the first service link antenna comprises a value of 21 dB/K and the G/T of the second service link antenna comprises a value of 9 dB/K.

43. The system according to claim 42 wherein the first service link antenna includes more radiators than the second service link antenna.

44. The system according to claim 39 wherein the first service link antenna is configured to receive both Left Hand Circularly Polarized (LHCP) radiation and Right Hand Circularly Polarized (RHCP) radiation and wherein the second service link antenna is configured to receive only LHCP or RHCP radiation.

45. The system according to claim 39 wherein the first and second service link antennas comprise reflectors.

46. The system according to claim 39 wherein the satellite further comprises a signal processing equipment for the second service link antenna and is free of the signal processing equipment for the first service link antenna.

47. The system according to claim 39 wherein the satellite further comprises a signal processing equipment for the first and/or second forward service links and is free of the signal processing equipment for the first and/or second return service links.

48. The system according to claim 46 wherein the signal processing equipment comprises beam forming and/or channelization equipment.

49. The system according to claim 47 wherein the signal processing equipment comprises beam forming and/or channelization equipment.

50. A radioterminal communications method comprising:
communicating between a satellite and at least one radioterminal using a first service link antenna configured to provide a first return service link and a first forward service link and a second service link antenna that is smaller than the first service link antenna and configured to provide a second return service link and a second forward service link;
processing on-board the satellite, signals associated with at least one of the first return service link, the first forward service link, the second return service link and/or the second forward service link; and
processing external to the satellite, signals associated with at least another one of the first return service link, the first forward service link, the second return service link and/or the second forward service link, and
wherein a gain-to-temperature ratio (G/T) of said first service link antenna configured to provide a first return service link comprises a value of 21 dB/K.

51. The method according to claim 50 wherein communicating comprises:
   communicating between the satellite and at least one radioterminal in a first geographic area using the first service link antenna; and
   communicating between the satellite and at least one radioterminal in a second geographic area that is larger than the first geographic area, using the second service link antenna.

52. The method according to claim 51 wherein the first geographic area is geographically distinct from, geographically overlaps with, or is geographically contained within the second geographic area.

53. The method according to claim 50 further comprising:
   forming smaller, higher gain satellite beams by the first service link antenna than by the second service link antenna.

54. The method according to claim 53 wherein the first service link antenna includes more radiators than the second service link antenna, and wherein the G/T of the first service link antenna comprises a value of 21 dB/K and the G/T of the second service link antenna comprises a value of 9 dB/K.

55. The method according to claim 50 further comprising:
   receiving both Left Hand Circularly Polarized (LHCP) radiation and Right Hand Circularly Polarized (RHCP) radiation at the first service link antenna; and
   receiving only LHCP or RHCP radiation at the second service link antenna.

56. The method according to claim 50 wherein the first and second service link antennas comprise reflectors.

57. The method according to claim 50:
   wherein processing on-board the satellite comprises processing signals associated with the second service link antenna on-board the satellite; and
   wherein processing external to the satellite comprises processing signals associated with the first service link antenna external to the satellite.

58. The method according to claim 50:
   wherein processing on-board the satellite comprises processing signals associated with the first and/or second forward service links on-board the satellite; and
   wherein processing external to the satellite comprises processing signals associated with the first and/or second return service links external to the satellite.

59. The method according to claim 57 wherein processing comprises beam forming and/or channelizing.

60. The method according to claim 58 wherein processing comprises beam forming and/or channelizing.

61. The system according to claim 1 wherein a beam forming processor that is associated with the at least one of the service link antennas is positioned remote from the satellite and is distributed between at least two gateways of the satellite.

62. The method according to claim 13 wherein a beam forming processor that is associated with the at least one of the service link antennas is positioned remote from the satellite and is distributed between at least two gateways of the satellite.

63. The system according to claim 25 wherein a beam forming processor that is associated with the first service link antenna is positioned remote from the satellite and is distributed between at least two gateways of the satellite.

64. The method according to claim 32 wherein a beam forming processor that is associated with the first service link antenna is positioned remote from the satellite and is distributed between at least two gateways of the satellite.

65. The system according to claim 39 wherein a beam forming processor that is associated with the first service link antenna is positioned remote from the satellite and is distributed between at least two gateways of the satellite.

66. The method according to claim 50 wherein a beam forming processor that is associated with the first service link antenna is positioned remote from the satellite and is distributed between at least two gateways of the satellite.

\* \* \* \* \*